US011193733B2

(12) United States Patent
Vandamia

(10) Patent No.: US 11,193,733 B2
(45) Date of Patent: Dec. 7, 2021

(54) OPTIC FOCUSING COVER

(71) Applicant: Christopher Vandamia, Eighty Four, PA (US)

(72) Inventor: Christopher Vandamia, Eighty Four, PA (US)

(*) Notice: Subject to any disclaimer, the term of this patent is extended or adjusted under 35 U.S.C. 154(b) by 180 days.

(21) Appl. No.: 16/504,409

(22) Filed: Jul. 8, 2019

(65) Prior Publication Data
US 2019/0331457 A1 Oct. 31, 2019

Related U.S. Application Data

(60) Provisional application No. 62/779,934, filed on Dec. 14, 2018.

(51) Int. Cl.
| | |
|---|---|
| *G02B 15/02* | (2006.01) |
| *F41G 1/38* | (2006.01) |
| *G02B 7/14* | (2021.01) |
| *G02C 5/00* | (2006.01) |
| *G02B 27/00* | (2006.01) |
| *F41G 1/14* | (2006.01) |
| *G02B 23/16* | (2006.01) |

(52) U.S. Cl.
CPC ............. *F41G 1/38* (2013.01); *F41G 1/14* (2013.01); *G02B 7/14* (2013.01); *G02B 23/16* (2013.01); *G02B 27/0025* (2013.01); *G02C 5/003* (2013.01)

(58) Field of Classification Search
CPC .... F41G 1/38; F41G 1/14; G02B 7/14; G02B 23/16; G02B 27/0025; G02C 5/003
USPC ........ 359/672, 673, 675, 819, 822, 827, 829
See application file for complete search history.

(56) References Cited

U.S. PATENT DOCUMENTS

| | | | | |
|---|---|---|---|---|
| 2,889,629 | A | * | 6/1959 | Darkenwald ........... F41G 1/383 42/129 |
| 5,299,067 | A | | 3/1994 | Kutz et al. |
| 5,365,670 | A | | 11/1994 | Klimochko |
| 5,835,289 | A | | 11/1998 | Berry |
| 6,480,339 | B2 | | 11/2002 | Clark |
| 9,880,397 | B1 | | 1/2018 | Sweeten et al. |
| 2002/0105730 | A1 | * | 8/2002 | Clark ..................... G02B 23/14 359/675 |
| 2009/0019758 | A1 | | 1/2009 | Baugher |
| 2017/0131517 | A1 | * | 5/2017 | Nagler ................... G02B 7/105 |

* cited by examiner

*Primary Examiner* — William Choi
(74) *Attorney, Agent, or Firm* — Boudwin Intellectual Property; Daniel Boudwin

(57) ABSTRACT

An optic focusing cover. The optic focusing cover includes a cylindrical body with openings at both ends. A corrective lens is disposed within the cylindrical body such that it covers the entire opening. The corrective lens is capable of further magnifying the telescope. A cap is attached to a first side of the cylindrical body, the cap is capable of going from an open to a closed configuration. A second end of the cylindrical body is configured to be accepted by a telescope.

9 Claims, 3 Drawing Sheets

OPTIC FOCUSING COVER

CROSS REFERENCE TO RELATED APPLICATIONS

This application claims the benefit of U.S. Provisional Application No. 62/779,934 filed on Dec. 14, 2018. The above identified patent application is herein incorporated by reference in its entirety to provide continuity of disclosure.

BACKGROUND OF THE INVENTION

The present invention relates to an optic focusing cover. More particularly, the present invention provides a cover for a telescope or other viewing device that will better focus the telescope.

Many weapons use various forms of optics to better enable a user to hit the target. An extremely popular type of optic is the telescope. Telescopes can be difficult to focus in when a user does not have perfect eye sight. Further, while some telescopes have a built-in focusing reticle many still do not, nor do older telescopes. This focusing reticle also is covered when a protective cover is applied to the telescope, making it hard to adjust without removing the telescope cover. These older scopes are still extremely costly. A shooter would find it difficult to replace a single rifle telescope due to the high cost. Further, changing telescopes just for an added bit of clarity can be an extremely long and detailed process.

Consequently, there is a need in for an improvement in the art of optic focusing. The present invention substantially diverges in design elements from the known art while at the same time solves a problem many people face when focusing a telescope. In this regard the present invention substantially fulfills these needs.

SUMMARY OF THE INVENTION

The present invention provides a focusing optic cover wherein the same can be utilized for providing convenience for the user when using a telescope. The present system comprises a cylindrical body with openings at both ends. A corrective lens is disposed within the cylindrical body such that it covers the entire opening. The corrective lens is capable of further magnifying the telescope. A cap is attached to a first side of the cylindrical body, the cap is capable of going from an open to a closed configuration. A second end of the cylindrical body is configured to be accepted by a telescope.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
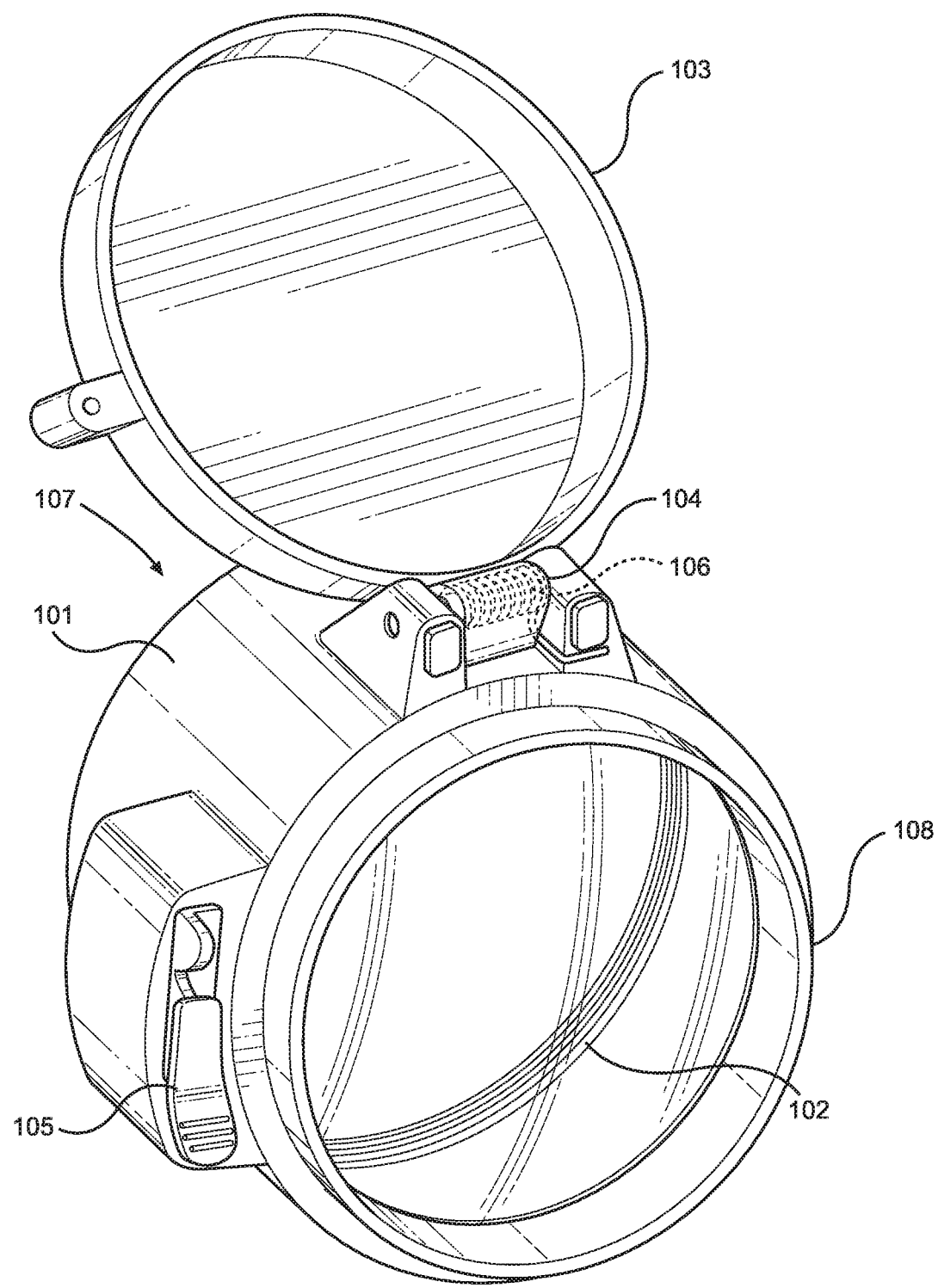
FIG. 1 shows a perspective view of an embodiment of the optic focusing cover with the cap in an open configuration.

Reference is made herein to the attached drawings. Like reference numerals are used throughout the drawings to depict like or similar elements of the focusing optic cover. For the purposes of presenting a brief and clear description of the present invention, the preferred embodiment will be discussed as used for providing clarity when using a telescope or other mounted optic. The figures are intended for representative purposes only and should not be considered to be limiting in any respect.

Referring now to FIG. 1, there is shown a perspective view of an embodiment of the optic focusing cover with the cap in an open configuration. The optic focusing cover has a cylindrical body 101 that has channel with an opening at the first end 108 and the second end 107. The cylindrical body 101 can be sized to fit over the end of any of a variety of different optic sizes. Traditionally, telescope optics are sized in 32 mm, 40 mm, 50 mm and 1 inch, as such, the cylinder may be made in the appropriate sizes to fit each of these sizes or any suitable optic. The cylindrical body 101 is made from rubber, plastic, a combination of the two or any other suitable material. In one embodiment, the entire cylindrical body 101 is made from rubber. In another embodiment, the entire cylindrical body 101 is made from plastic. In one embodiment the cylindrical body 101 is made from a mixture of rubber and plastic. In this embodiment the cylindrical body 101 has a rubber front portion and a plastic rear portion.

A corrective lens 102 is placed within the cylindrical body 101 closer to the first end 108. The corrective lens 102 is configured to focus the reticle in the optic. In one embodiment, the corrective lens 102 may be an over-the-counter lens similar to a reading lens. In a second embodiment, the corrective lens 102 may be a prescription lens. The corrective lens 102 is fit inside the cylindrical body using a friction fit. In another embodiment, the cylindrical body 101 has a groove internally that holds the corrective lens 102 in place. This embodiment will ensure that the lens is held in the correct position and is not moved by the recoil from a firearm.

A cap 103 is attached to the first end 108 of the cylindrical body 101. The cap 103 is configured to be freely movable from an open to a closed position. In one embodiment, the cap 103 is separate from the cylindrical body 101 and can be removed for use. In another embodiment, the cap 103 is attached to the cylindrical body 101 using a hinge 104. The hinge 104 is attached to the outside of the cylindrical body 101. The cap 103 is held in a closed configuration by a friction fit. In another embodiment, the cap 103 may be held in place with a catch device 105. As illustrated, the catch device 105 is a push button catch, wherein the push button is engaged via XXX resulting in YYY. In one embodiment, the cap 103 has a spring 106 that biases the cap in an open configuration such that it will not close during use.

Figure 2:
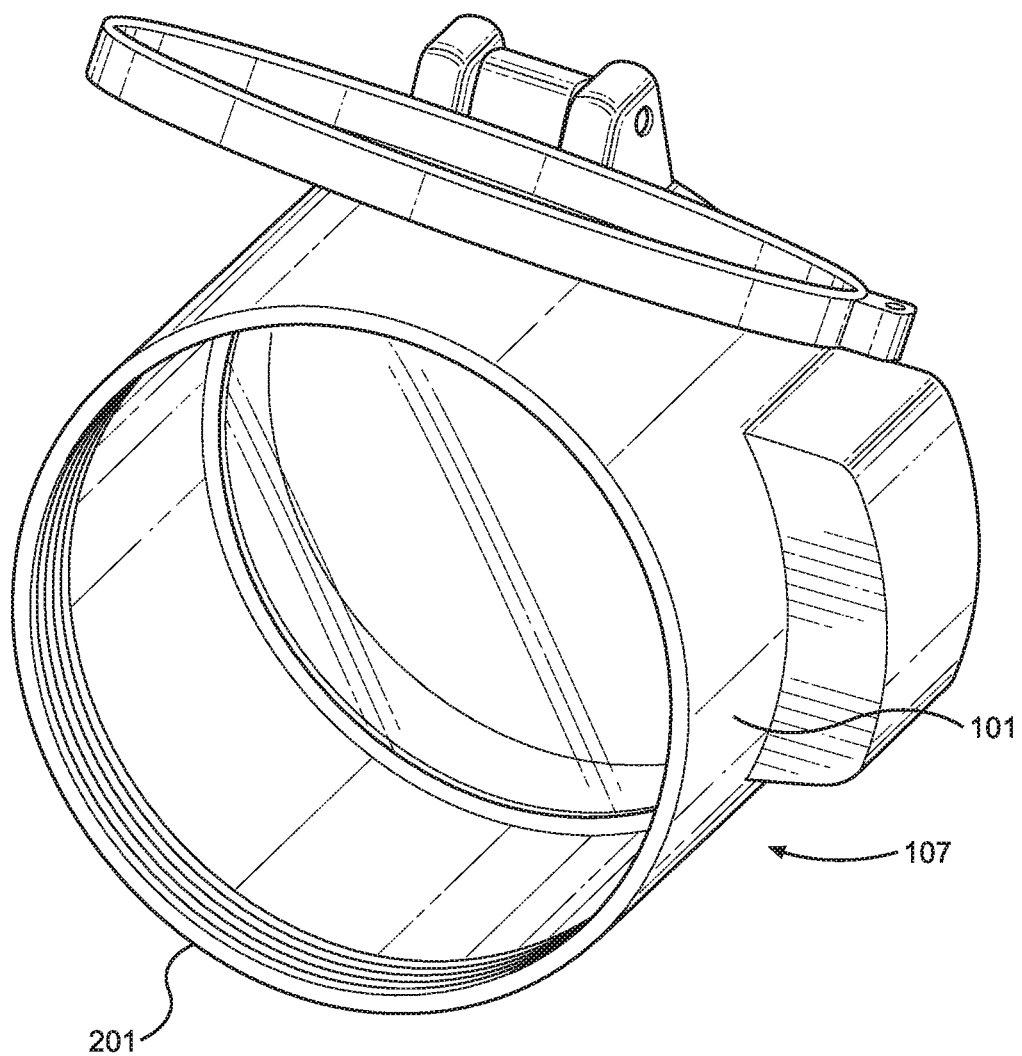
FIG. 2 shows a perspective view of an embodiment of the optic focusing cover with threads on the interior of the cover.

Referring now to FIG. 2, there is shown a perspective view of an embodiment of the optic focusing cover with threads on the interior of the cover. The optic focusing cover is configured to attach to an optic in multiple ways. In one embodiment, the optic focusing cover has threads 201 on the interior of the second end 107 of the cylindrical body 101. The threads are configured to match the threads that are found on a telescope or other optic. In a second embodiment, the cylindrical body is configured to be held on the optic via a friction fit.

Figure 3:
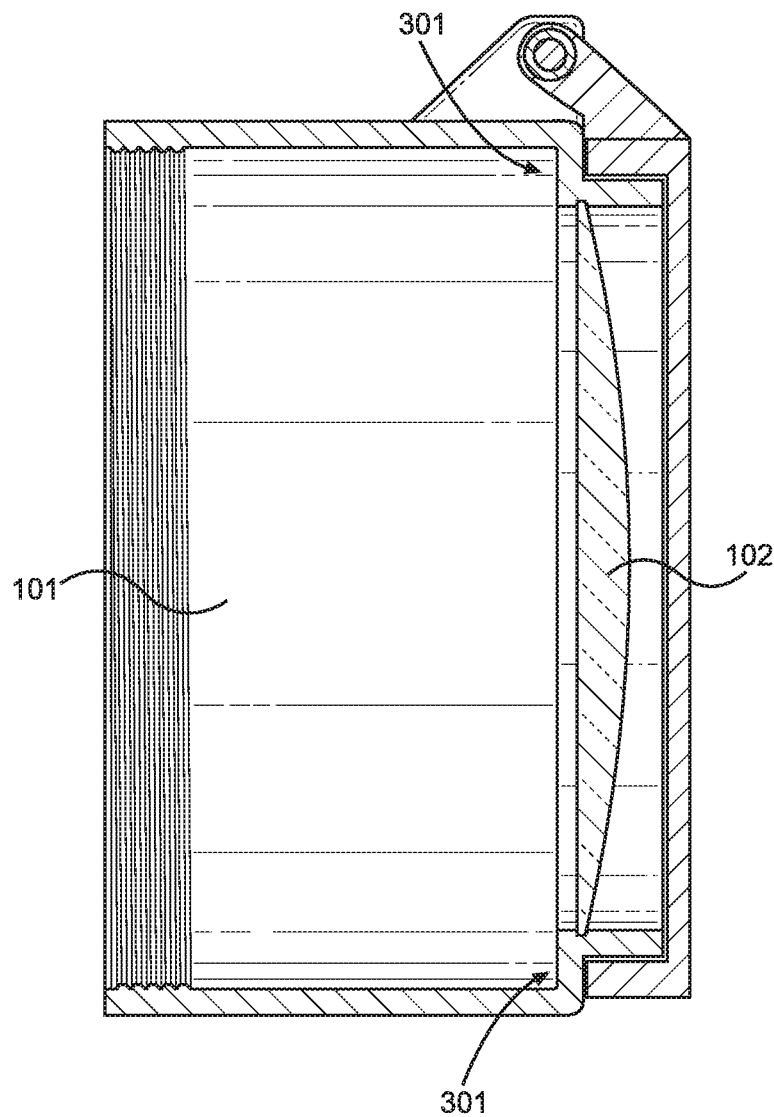
FIG. 3 shows a cross sectional view of an embodiment of the optic focusing cover.

Referring now to FIG. 3, there is shown a cross sectional view of an embodiment of the optic focusing cover. In one embodiment, there is a stop 301 placed in the cylindrical body 101. This stop will prevent the optic focusing cover from being pushed to far onto an optic. In some cases, the optic focusing cover could be pushed to such an extent that the corrective lens 102 will contact the optic. This lens could become damaged. The stop 301 is configured to be a raised portion that will prevent the optic focusing cover from impacting the optic and becoming damaged.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An optic focusing cover, comprising:
a cylindrical body defining a channel with openings at a first end and a second end of the cylindrical body;
a corrective lens disposed within the cylindrical body;
wherein the cylindrical body comprises a groove internally that holds the corrective lens in place;
a cap attached to the first side of the cylindrical body via a hinge;
the second end of the cylindrical body configured to be accepted by a telescope.

2. The optic focusing cover of claim 1, further comprising a lens that is a capable of further magnifying the telescope.

3. The optic focusing cover of claim 1, further comprising threads on the interior of the second end of the cylindrical body configured to be screwed on to a telescope.

4. The optic focusing cover of claim 1, wherein, the cap is capable of going from an open to a closed configuration.

5. The optic focusing cover of claim 4, further comprising a spring that will propel the cap into an open configuration once released from the closed position.

6. The optic focusing cover of claim 1, wherein the corrective lens is fit inside the cylindrical body using a friction fit.

7. The optic focusing cover of claim 1, wherein the cap is held in place with a catch device.

8. The optic focusing cover of claim 7, wherein the catch device is a push bottom catch.

9. The optic focusing cover of claim 1, further comprising a stop placed in the channel, the stop configured to prevent the optic focusing cover from being pushed too far onto an optic.

* * * * *